United States Patent
Harrison (10) Patent No.: US 11,372,097 B2
(45) Date of Patent: Jun. 28, 2022

(54) METHOD AND APPARATUS FOR PHASE UNWRAPPING RADAR DETECTIONS USING OPTICAL FLOW

(71) Applicant: Metawave Corporation, Palo Alto, CA (US)

(72) Inventor: Matt Harrison, Palo Alto, CA (US)

(*) Notice: Subject to any disclaimer, the term of this patent is extended or adjusted under 35 U.S.C. 154(b) by 208 days.

(21) Appl. No.: 16/597,789

(22) Filed: Oct. 9, 2019

(65) Prior Publication Data

US 2020/0110167 A1 Apr. 9, 2020

Related U.S. Application Data

(60) Provisional application No. 62/743,406, filed on Oct. 9, 2018.

(51) Int. Cl.
*G01S 13/58* (2006.01)
*G01S 7/35* (2006.01)

(52) U.S. Cl.
CPC ............ *G01S 13/584* (2013.01); *G01S 7/352* (2013.01); *G01S 7/356* (2021.05)

(58) Field of Classification Search
CPC ......... G01S 13/584; G01S 7/352; G01S 7/356
USPC ......................................................... 342/109
See application file for complete search history.

(56) References Cited

U.S. PATENT DOCUMENTS

| | | | | |
|---|---|---|---|---|
| 6,577,269 B2* | 6/2003 | Woodington | ......... | G01S 13/865 342/72 |
| 6,690,474 B1* | 2/2004 | Shirley | .............. | G01B 11/2527 356/605 |
| 6,864,831 B2* | 3/2005 | Woodington | ............ | H01Q 3/40 342/195 |
| 6,977,609 B2* | 12/2005 | Pleva | ...................... | G01S 7/354 342/28 |
| 7,667,637 B2* | 2/2010 | Pedersen | ............... | G01S 13/584 342/127 |
| 8,334,800 B2* | 12/2012 | Hayase | ................... | G01S 13/18 342/84 |
| 8,463,579 B2* | 6/2013 | Vierinen | ............... | G01S 7/2926 702/181 |
| 9,581,967 B1* | 2/2017 | Krause | ................. | G03H 1/0443 |
| 9,702,960 B2* | 7/2017 | Broad | ........................ | G01S 3/50 |
| 10,205,457 B1* | 2/2019 | Josefsberg | .............. | G01S 7/032 |
| 10,438,036 B1* | 10/2019 | Reome | .................. | G06K 7/1404 |
| 10,782,395 B2* | 9/2020 | Tong | ........................ | G01S 7/003 |
| 2002/0044082 A1* | 4/2002 | Woodington | ......... | G01S 7/4004 342/128 |

(Continued)

OTHER PUBLICATIONS

L. Danielsson, "Tracking and Radar Sensor Modelling for Automotive Safety Systems," Thesis for the Degree of Doctor of Philosopie, Department of Signals and Systems, Signal Processing Group, Chalmers University of Technology, Goteborg, Sweden, pp. 1-102, 2010.

(Continued)

*Primary Examiner* — Bernarr E Gregory
*Assistant Examiner* — Nuzhat Pervin
(74) *Attorney, Agent, or Firm* — Sandra Lynn Godsey (57) ABSTRACT

Radar systems are disclosed having phase measures limited to +/−π. An optical flow method considers the time derivative of the range with respect to phase (or velocity), and gives an indication of whether the phase is outside the measurable range by comparing the derivatives to forward and reverse wrap thresholds.

20 Claims, 11 Drawing Sheets

(56) References Cited

U.S. PATENT DOCUMENTS

| | | | | |
|---|---|---|---|---|
| 2002/0196179 | A1* | 12/2002 | Mattox | G01S 7/352 342/194 |
| 2003/0058036 | A1* | 3/2003 | Stillman | H04L 27/2272 329/307 |
| 2003/0193335 | A1* | 10/2003 | Patch | G01R 33/565 324/309 |
| 2003/0210172 | A1* | 11/2003 | Pleva | H01Q 1/3283 342/72 |
| 2004/0174294 | A1* | 9/2004 | Arnold | G01S 13/588 342/104 |
| 2004/0257266 | A1* | 12/2004 | Pleva | H01Q 25/00 342/27 |
| 2005/0030393 | A1* | 2/2005 | Tull | G06T 1/0007 348/241 |
| 2006/0007423 | A1* | 1/2006 | Guruprasad | G01S 13/103 356/5.11 |
| 2007/0280507 | A1* | 12/2007 | Murali | G01P 5/001 382/107 |
| 2008/0195338 | A1* | 8/2008 | Geisheimer | G01S 13/88 702/77 |
| 2009/0322859 | A1* | 12/2009 | Shelton | H04N 13/207 348/46 |
| 2010/0079331 | A1* | 4/2010 | Battisti | G01S 13/9029 342/160 |
| 2012/0235855 | A1* | 9/2012 | Kurtz | G01S 13/584 342/128 |
| 2013/0241765 | A1* | 9/2013 | Kozma | G01S 13/86 342/107 |
| 2014/0184447 | A1* | 7/2014 | Zhou | G01S 13/84 342/127 |
| 2016/0259037 | A1* | 9/2016 | Molchanov | G06V 40/28 |
| 2017/0097405 | A1* | 4/2017 | Lerner | G01S 15/58 |
| 2019/0082952 | A1* | 3/2019 | Zhang | A61B 5/0066 |
| 2019/0103663 | A1* | 4/2019 | Ichinose | H01Q 21/064 |
| 2019/0120955 | A1* | 4/2019 | Zhong | B60R 11/04 |
| 2019/0154439 | A1* | 5/2019 | Binder | G01S 13/878 |
| 2020/0198650 | A1* | 6/2020 | Ribbens | B60W 40/105 |
| 2021/0206391 | A1* | 7/2021 | Sakano | G01C 21/3807 |

OTHER PUBLICATIONS

S.-H. Jeong, et al., "A Multi-Beam and Multi-Range Radar With Fmcwand Digital Beam Forming for Automotive Applications," Progress in Electromagnetics Research, vol. 124, pp. 285-299, 2012.

T.J. Pizzillo et al., "A Technique for Calibrating the Phase Detector of Wideband Radars Using a Phase Modulation and Demodulation Scheme," Army Research Laboratory, ARL-TR-1567, Adelphi, MD 20783-1197, pp. 1-13, May 1998.

S. Carpenter, "Autonomous Vehicle Radar: Improving Radar Performance with Simulation," White Paper, High Frequency/ Electronics Business Unit, ANSYS, Canonsburg, PA, pp. 1-14, 2017.

G. Reina, et al., "Short-Range Radar Perception in Outdoor Environments," Department of Engineering for Innovation, University of Salento, Lecce, Italy, Springer Verlag, Berlin, pp. 265-276, 2011.

S. Milch et al., "Pedestrian Detection with Radar and Computer Vision," Smart Microwave Sensors GmbH, Braunschweig, Germany, pp. 1-7, 2001.

S. Chang et al., "An algorithm for UWB radar-based human detection," Engineering & Applied Science, California Institute of Technology, MC Pasadena; Research Laboratories, DENSO Corporation, Aichi Japan; pp. 1-6, 2009.

F. Folster, et al., "Signal Processing Structure For Automotive Radar," Frequenz, vol. 60, Issue 1-2, pp. 20-24, 2006.

A. Hassanien et al., "Phase-Modulation Based Dual-Function Radar-Communications," pp. 1-27, Feb. 2016.

A. Macaveiu et al., "Kalman-Based Tracker for Multiple Radar Targets," Politehnica University Timisoara, Communications Department, Timisoara, Romania, pp. 1-4, 2014.

J-Jr. Lin, et al., "Design of an FMCW Radar Baseband Signal Processing System for Automotive Application," Springer Plus, 5:42, pp. 4-16, Jan. 2016.

H. Rohling et al., "Waveform Design Principles for Automotive Radar Systems," Technical University of Hamburg-Harburg, Germany, Department of Telecommunications, pp. 1-4, Feb. 2001.

M. Steinhauer et al., "Millimeter-Wave-Radar Sensor Based on a Transceiver Array for Automotive Applications," IEEE Transactions on Microwave Theory and Techniques, vol. 56, No. 2, pp. 1-9, Feb. 2008.

P. Molchanov, "Radar Target Classification by Micro-Doppler Contributions," Thesis for the degree of Doctor of Science in Technology, Tampere University of Technology, Tampere, Finland, Publication 1255, pp. 1-187, Oct. 2014.

L. Boccia et al., "Multilayer Antenna-Filter Antenna for Beam-Steering Transmit-Array Applications," in IEEE Transactions on Microwave Theory and Techniques, vol. 60, No. 7, pp. 2287-2300, Jul. 2012.

G. Reina et al., "A Self-Learning Ground Classifier using Radar Features," Springer Tracts in Advanced Robotics, pp. 1-14, Dec. 2014.

M. Tons et al.."Radar Sensors and Sensor Platform used for Pedestrian Protection in the EC-funded Project Save-U," IEEE Intelligent Vehicles Symposium, 2004, Parma, Italy, pp. 813-818, Jun. 2004.

H. Rohling , "Some Radar Topics: Waveform Design, Range Cfar and Target Recognition," Technical University of Hamburg-Harburg, Hamburg, Germany, Department of Telecommunications, pp. 1-30.

J.P. Stralka et al., "Constant-envelope OFDM phase modulated radar waveforms," In Adaptive Sensor Array Processing (ASAP) Workshop, pp. 5-6. 2007.

Hima et al., "A Study on Stepped Frequency Radar by Using Intra-Pulse Phase Coded Modulation," Proceedings of the World Congress on Engineering and Computer Science, WCECS, pp. 1-6, Oct. 2008.

S. Patole et al., "Automotive Radars: A Review of Signal Processing Techniques," Signal Processing for Smart Vehicle Technologies: Part 2, in IEEE Signal Processing Magazine, pp. 22-35, Mar. 2017.

Moon-Sik Lee et al., System Modeling and Signal Processing for a Switch Antenna Array Radar, IEEE Transacations on Signal Processing, vol. 52, No. 6, pp. 1-11, Jun. 2004.

* cited by examiner

METHOD AND APPARATUS FOR PHASE UNWRAPPING RADAR DETECTIONS USING OPTICAL FLOW

CROSS REFERENCE TO RELATED APPLICATION

The present application claims priority to U.S. Provisional Patent Application Ser. No. 62/743,406, filed on Oct. 9, 2018, which is incorporated by reference in its entirety.

BACKGROUND

In an object detection system, there may be many objects moving independently. This introduces many variables into the problem of identifying a location and velocity of a given object. Object detection systems using radar technology may implement modulation techniques that use phase of a received signal to provide information about the location and movement of an object. As such, they are therefore limited by the phase range detectible (e.g., $-\pi$ to $+\pi$) and, specifically, are subject to wrapping when a maximum phase (e.g., $+/-\pi$) is exceeded. This leads to incorrect results in the information deduced from the phase information. This is referred to as phase wrapping, and is an artifact of the way the phase is calculated.

BRIEF DESCRIPTION OF THE DRAWINGS

The present application may be more fully appreciated in connection with the following detailed description taken in conjunction with the accompanying drawings, which may not be drawn to scale and in which like reference characters refer to like parts throughout, and in which.

DETAILED DESCRIPTION

Methods and apparatuses to improve object detection in a radar system are disclosed. There are many applications for these solutions, including those as illustrated herein below in a radar system for driver assist and autonomous operation of a vehicle. This is not meant to be limiting, but rather provided for clarity of understanding.

Figure 1:
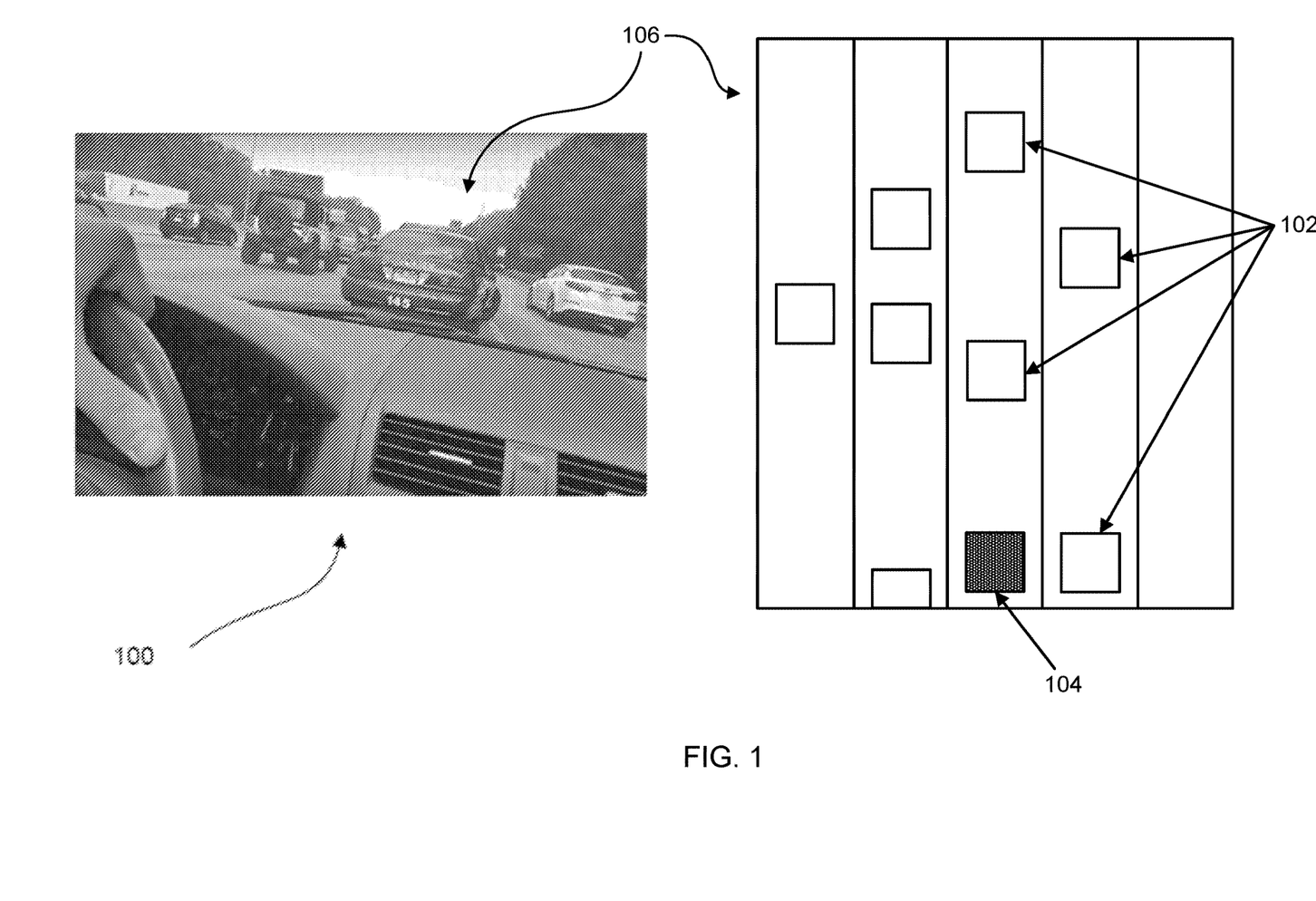
FIG. 1 illustrates perspectives of an object detection system for a vehicular application, according to various implementations of the subject technology.

An object detection system in a vehicle is a moving sensor that is tasked with understanding the environment within which it operates. As illustrated in FIG. 1, a vehicle 104 may be traveling on a busy multi-lane highway 106 with vehicles 102 and 104 moving at a variety of speeds in multiple directions. The vehicle 104 operates within environment 100 and must navigate other vehicles 102.

In object detection systems incorporating a radar modulation scheme, such as a frequency-modulated carrier-wave (FMCW) scheme, the difference between transmit and receive signals provides range information and velocity. The velocity is deduced from the phase difference between the transmit and receive signals.

Figure 2:
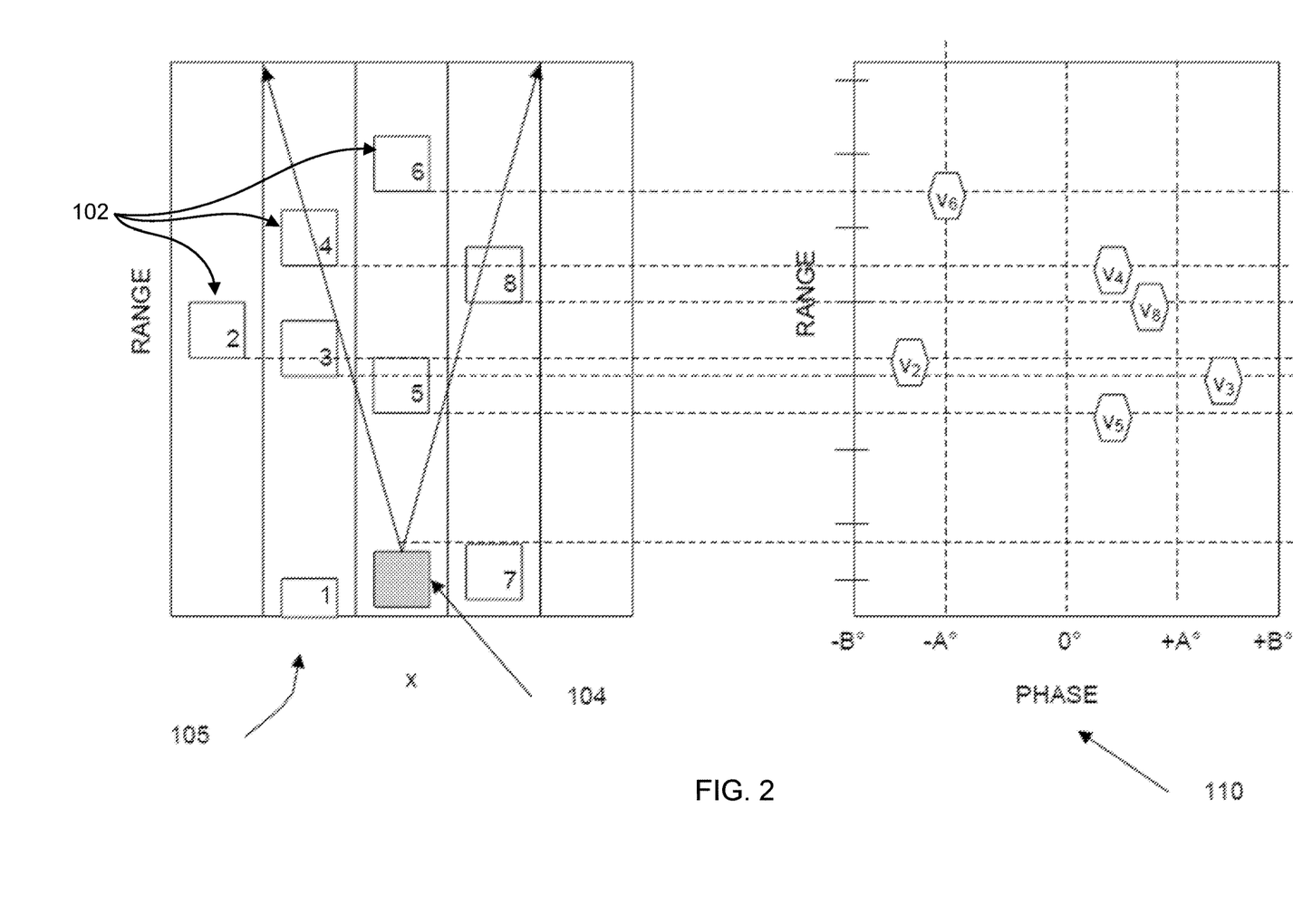
FIG. 2 illustrates position and velocity of the vehicles of FIG. 1 as a function of range, according to various implementations of the subject technology.

FIG. 2 illustrates a mapping 110 of the system 105 where the vehicle 104 has a sensor detecting objects within an angular range as indicated. There are several vehicles 102 indicated as 1, 2, 3, 4, 5, 6, 7, and 8, which may be moving in a forward or reverse direction or may be stationary. The vehicles are identified as 1, 2, 3, 4, 5, 6, 7, and 8 and some of the vehicles, including 2, 3, 4, 5, 6, and 8 are mapped to a Range-Doppler Map (RDM) as V2, V3, V4, V5, V6, and V8, where the range from vehicle 104 to a given vehicle is mapped with respect to the velocity of the vehicle. As there is a relationship between phase and velocity, the phase difference is graphed as corresponding to velocity. The velocity is a function of phase (i.e. velocity=f(phase)). In the present embodiments, the value of B is 180°, or $\pi$, and the value of A is some intermediary value. Understanding the velocity of a vehicle and its range provides information to anticipate where that vehicle is moving.

As velocity of a vehicle, such as vehicle 104, is measured by the phase difference of received signals, there is a limit to the ability to directly measure velocity due to the phase wrapping that occurs after $+/-\pi$. As used herein, phase difference will be generally referred to as phase, but the reader understands that this is a measure taken from a received radar signal.

Figure 3:
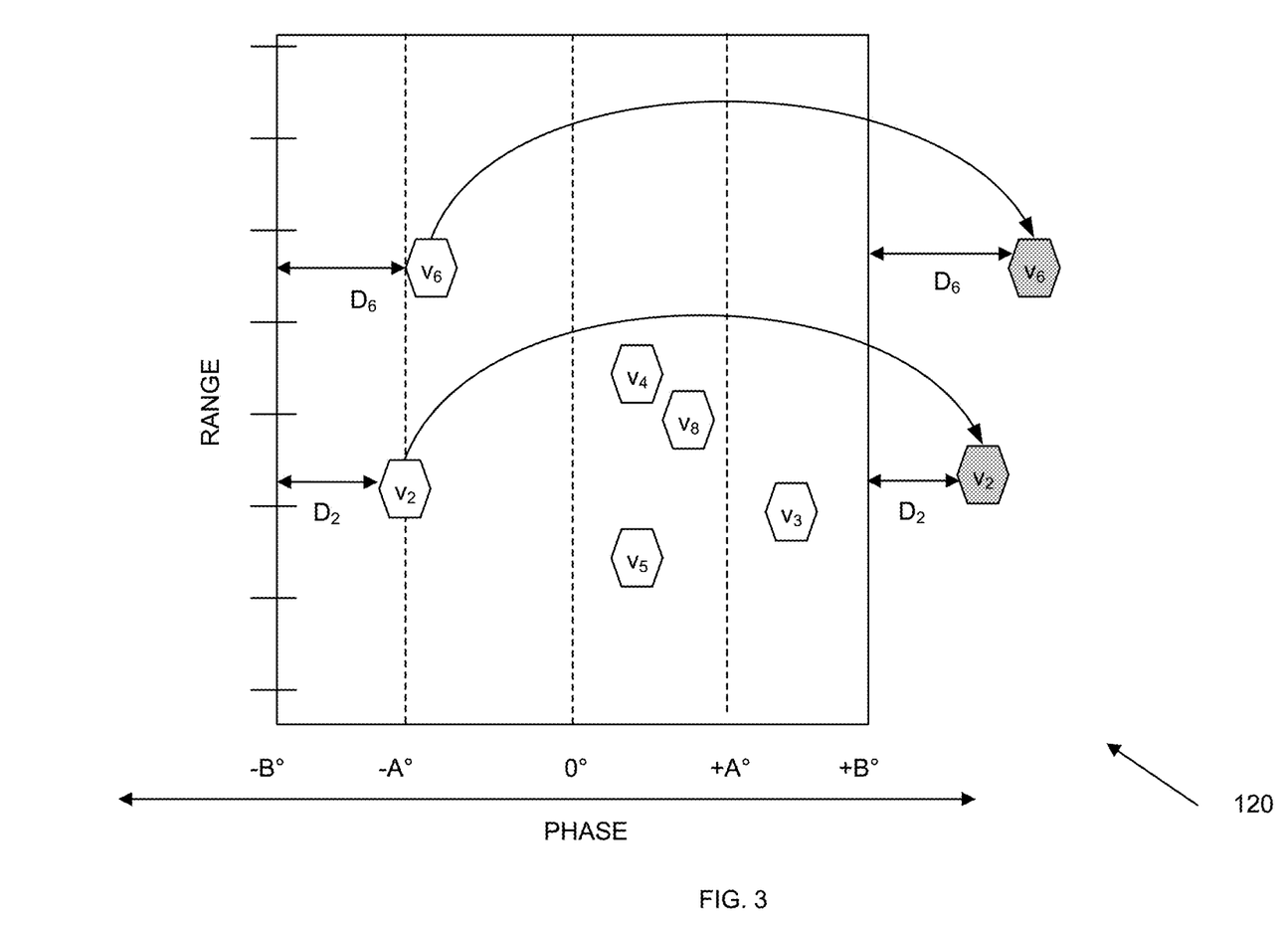
FIG. 3 illustrates phase unwrapping of phase measured by an object detection system, according to various implementations of the subject technology.

FIG. 3 illustrates the mapping 120 of vehicle velocities illustrating phase unwrapping. As is shown in the mapping 120, the detectable phase range is $-B$ (i.e. $-\pi$) to $+B$ (i.e. $+\pi$). The phase of the vehicles is subject to wrapping when a maximum phase (i.e. $+/-\pi$) is exceeded.

As illustrated, the phase of vehicle $V_2$ measured by the object detection system is $D_2$ greater than $-\pi$, or $-B$. However, a forward wrap threshold of $+\pi$ (e.g., refer to the forward wrap threshold $\pi$ on FIG. 8A) is determined to be exceeded and, therefore, the phase is wrapped (the wrap thresholds will be discussed in detail in the description of FIG. 8A). The velocity of vehicle $V_2$ cannot be directly derived given the phase-wrapping, as the actual phase of vehicle $V_2$ is greater than $+B$, or $\pi$. When the phase of vehicle $V_2$ is unwrapped, the phase difference between the actual phase of $V_2$ and $+B$ is $D_2$ as is shown.

A similar situation occurs with vehicle $V_6$, where the phase of vehicle $V_6$ is measured to be $D_6$ greater than $-\pi$, or $-B$. Similar to vehicle $V_2$, for vehicle $V_6$ a forward wrap threshold of $+\pi$ is determined to be exceeded and, as such, the phase is wrapped. When the phase of vehicle $V_6$ is unwrapped, the phase difference between the actual phase of $V_6$ and $+B$ is $D_6$ as shown. The methods and apparatuses disclosed herein provide solutions to detect whether the phase is wrapped, to unwrap the phase, and to identify the correct velocity using optical flow concepts.

Figure 4:
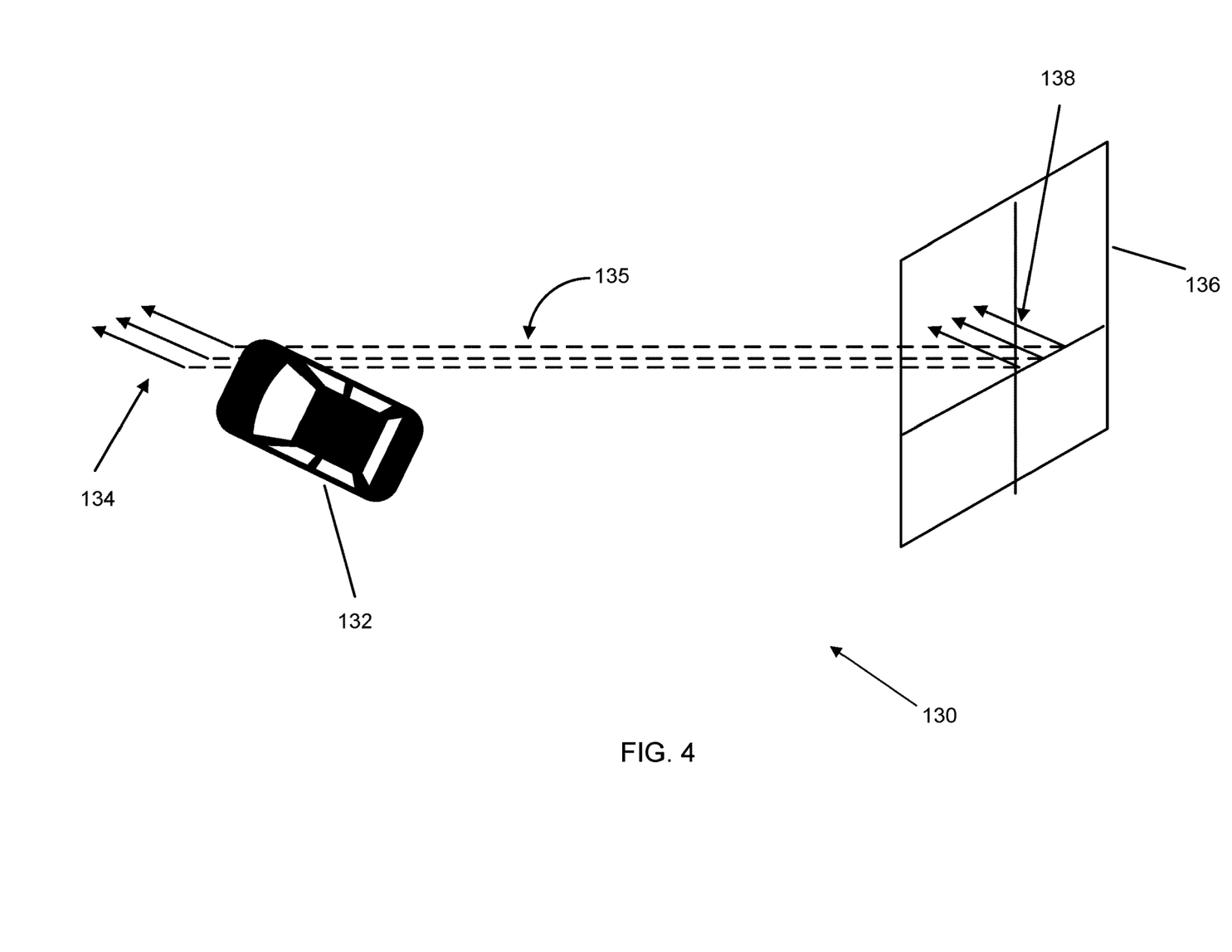
FIG. 4 illustrates an object flow mapping of the movement of a vehicle to a two-dimensional (2-D) plane, according to various implementations of the subject technology.

As illustrated in FIG. 4, movement of a car in three-dimensions (3-D) may be mapped to a two-dimensional (2-D) planar view using optical flow processes to indicate the movement. The vehicle 132 of system 130 is moving in a direction indicated by vectors 134. These vectors 134 are then mapped to plane 136 as vectors 138, where the mapping is indicated as dashed lines 135. The optical flow method uses a 2-D plane (e.g., plane 136) to describe the detection area of the sensor not shown). For a radar sensor, the detection area is the area covered by the transmit and receive beams of the antenna, within which the radar has the capability to detect an object. This does not necessarily consider the angular resolution of the radar, which is the capability to distinguish different objects within the detection area. The optical flow is a 2-D projection of the physical movement of an object, as viewed from the sensor, to a 2-D displacement of pixels within an image plane. Pixels refer to small units within the image plane; the term "pixel" comes from video frame processing, and is used herein to identify a small unit representing a physical location, such as in an RDM.

Continuing with FIG. 4, the vehicle 132 is moving in the direction of vectors 134 at a time instant. That instant is considered in relation to prior movement to determine an effective trajectory. These movement vectors 134 are then applied to multiple time instants, each corresponding to a scan of the environment.

Figure 5:
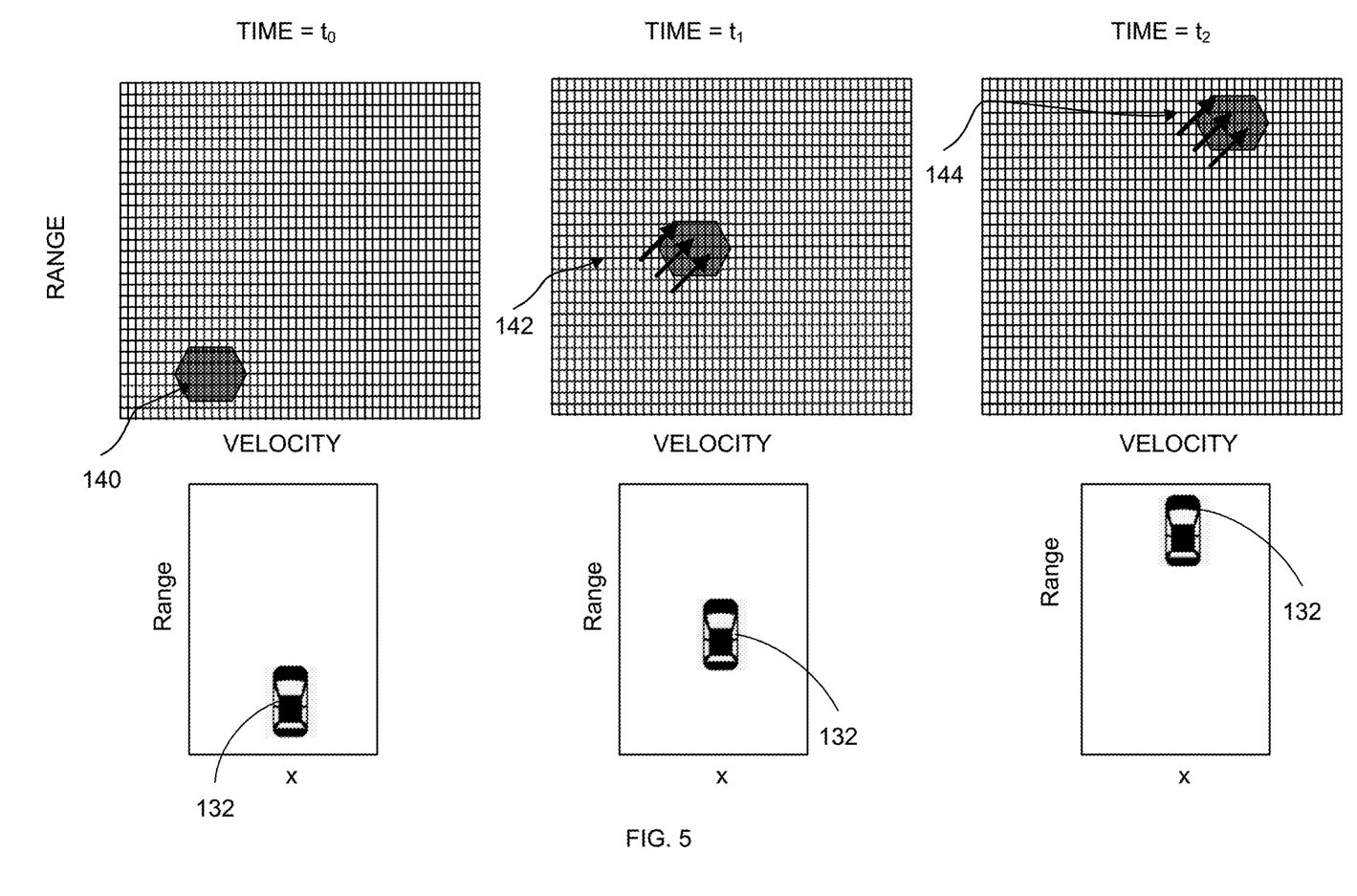
FIG. 5 illustrates movement of a vehicle and the corresponding optical flow mapping for a vehicle as in FIG. 4, according to various implementations of the subject technology.

FIG. 5 illustrates multiple time instances of measurements of phase of the vehicle 132. At the first time, to, the RDM identifies the vehicle 132 at area 140. As indicated, the vehicle 132 is at close range to the sensor. At time $t_1$ the vehicle 132 has moved further away from the sensor, and has a greater range, as well as an increased velocity. This is indicated as area 142. Then at time $t_2$ the distance from the sensor to the vehicle 132 increases, thus the range and the velocity continue to increase, as indicated by area 144.

Figure 6:
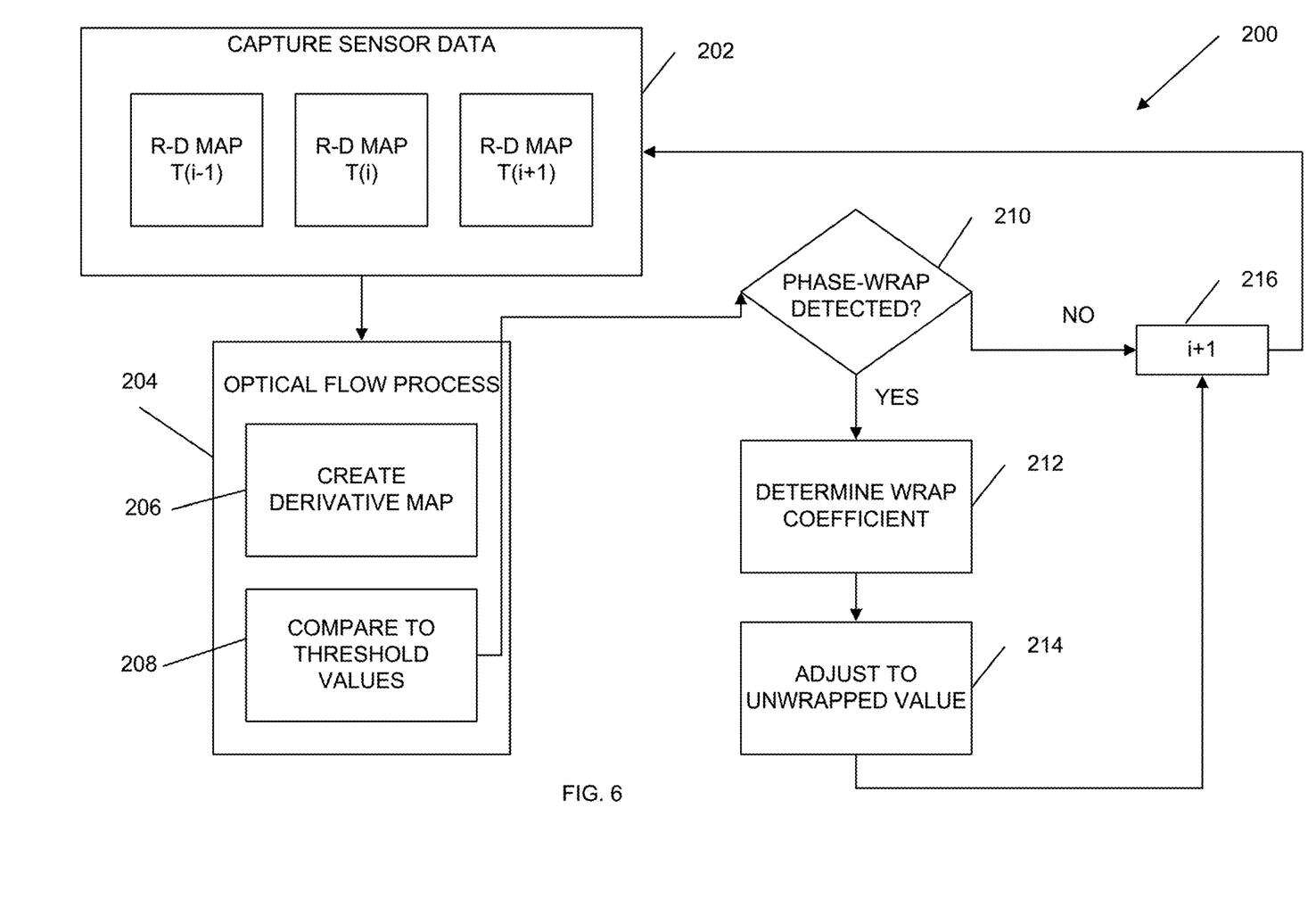
FIG. 6 is a flow diagram of a process for identifying objects as a function of object flow mapping, according to various implementations of the subject technology.

FIG. 6 illustrates a method for detecting if radar detection results are affected by phase-wrapping and adjusting the results accordingly. The process 200 considers components of successive RDMs from radar scans of a field of view, wherein the radar scans are taken at sequential times, $T(i-1)$, $T(i)$, and $T(i+1)$. In the illustrated example, the process captures sensor data, 202. This data is then presented to an optical flow process 204, to create a time derivative map (refer to FIG. 8A), 206, which is compared to threshold values, 208, to identify phase-wrapped values. The process then determines if any phase-wrap is detected, 210. If no phase-wrap is detected, 210, the process continues to the next set of sensor data, 216; else, the process determines a wrap coefficient, 212. The wrap coefficient provides information as to how many times the phase has wrapped and, thus, as to how to adjust for an accurate velocity. The process adjusts to the unwrapped value, 214. The process then continues to the next sensor data. In this way, the received data is monitored to identify a velocity that is not within the measurable range of the radar system.

Figure 7A:
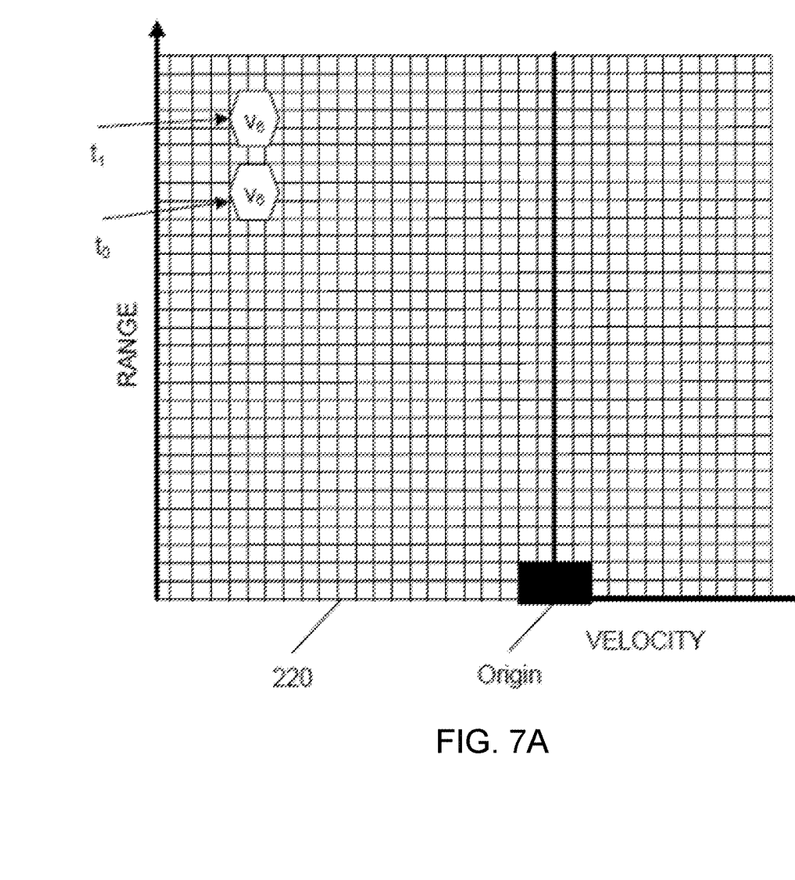
FIGS. 7A, 7B, 7C, and 7D illustrate a mapping of the movement of a vehicle as a function of object flow mapping using a process as in FIG. 6, according to example embodiments of the present invention.
Figure 7B:
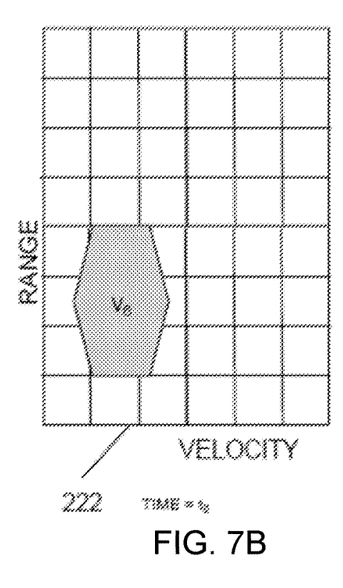
Figure 7C:
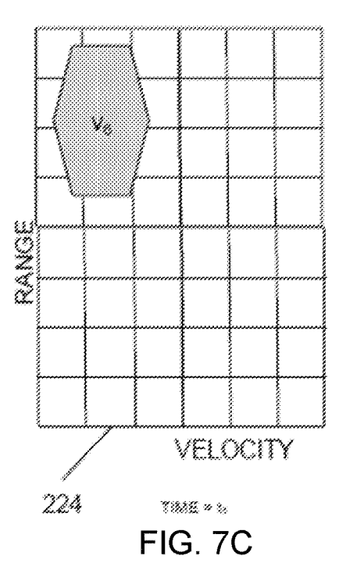
Figure 7D:
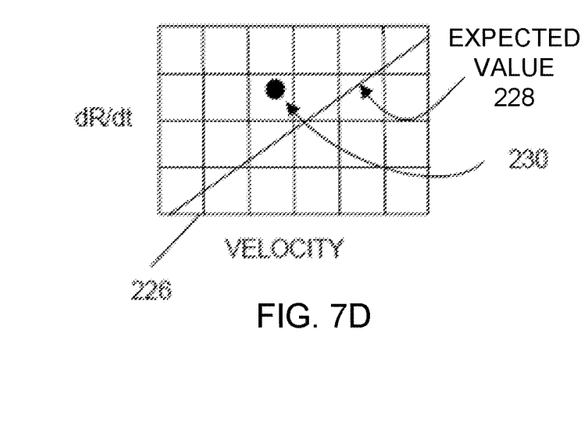

FIGS. 7A, 7B, 7C, and 7D illustrate an example of the process 200 of FIG. 6 in operation for a vehicle $V_6$, where the movement is increasing in range and velocity. The RDM 220 illustrated in FIG. 7A is not shown in complete form, but rather focuses on the coordinate area describing the vehicle $V_6$ and its movement. The RDM 220 is an overlay for two points in time, a first coordinate location for to and a second coordinate location for $t_1$. The RDM 220 is shown in expanded view as RDM portion 222 illustrated in FIG. 7B corresponding to time to, and portion 224 illustrated in FIG. 7C corresponding to time $t_1$. As the velocity is constant, the vehicle $V_6$ continues to move in an expected way with respect to the sensor. Where the sensor has a velocity different from that of the object (e.g., vehicle $V_6$), the distance between them changes and, thus, there is a change in the range. The plot 226 depicted in FIG. 7D illustrates the change in pixel values resulting from the movement of vehicle $V_6$. The expected value line 208 of plot 226 is an expected direct linear relationship between the time derivative of the range and the measured velocity. The exemplary value 230, which is close to the expected value line on plot 226, is an exemplary value representing the actual movement of vehicle $V_6$.

Figure 8A:
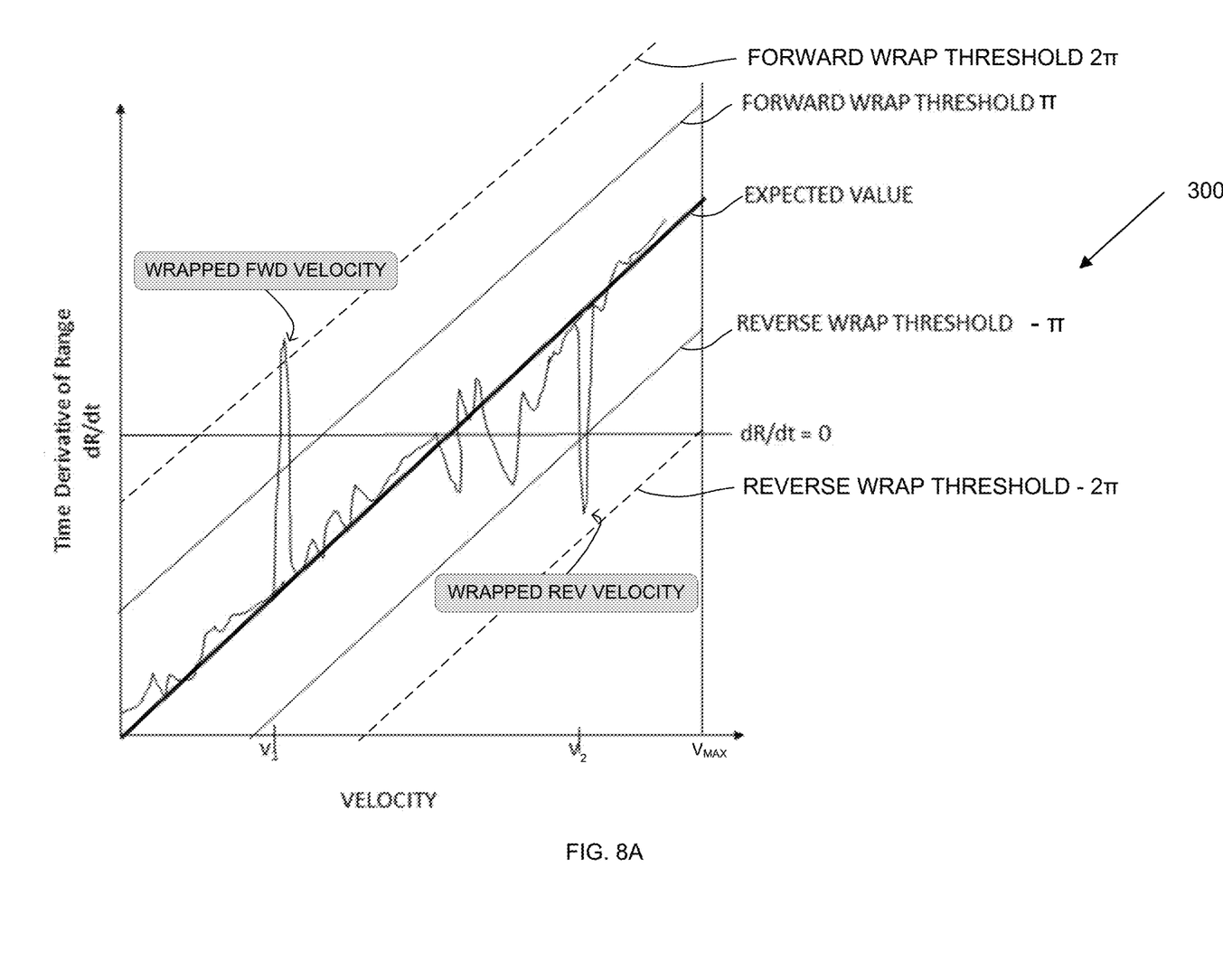
FIG. 8A illustrates a plot of velocity measures and thresholds indicating phase wrapping, according to various examples.

FIG. 8A illustrates a threshold scheme 300 for determining whether a phase is wrapped (i.e. for determining phase-wrap). There is an expected direct relationship between the time derivative of the range and the measured velocity. The line describing this expected relationship (i.e. the expected value line in the plot of FIG. 8A) defines the midpoints between threshold values. The plot of FIG. 8A also includes a line representing a forward wrap threshold of $+\pi$, a line representing a reverse wrap threshold of $-\pi$, a line representing a forward wrap threshold of $+2\pi$, and a line representing a reverse wrap threshold of $-2\pi$.

The maximum velocity ($V_{max}$) corresponds to a phase of $+\pi$. When a range change exceeds the forward wrap threshold of $+\pi$, this indicates that the detected object is moving faster than directly measurable with the radar system and, thus, the phase has been wrapped in a forward direction. Similarly, where the time derivative of the range is below the reverse wrap threshold of $-\pi$, the object is moving in a reverse direction and exceeds the directly measurable capability of the radar system and, as such, the phase has been wrapped in a reverse direction.

For example, in FIG. 8A, the time derivative of the range for vehicle $V_1$ is shown to be exceeding the forward wrap threshold of $+2\pi$; this indicates that the phase has been wrapped twice in a forward direction. Also shown, the time derivative of the range for vehicle $V_2$ is shown to be exceeding the reverse wrap threshold of $-\pi$; this indicates that the phase has been wrapped a single time in a reverse direction.

Heuristically, it may be understood that the methods disclosed herein compare independent measures of velocity. The measurement of phase has high precision, but is susceptible to the aforementioned phase-wrapping ambiguity. The measurement of the time derivative of the range is subject to high noise, but has no such ambiguity. The time derivative information can therefore be used to resolve the phase-wrapping ambiguity while retaining the precision of the phase measurement approach.

Figure 8B:
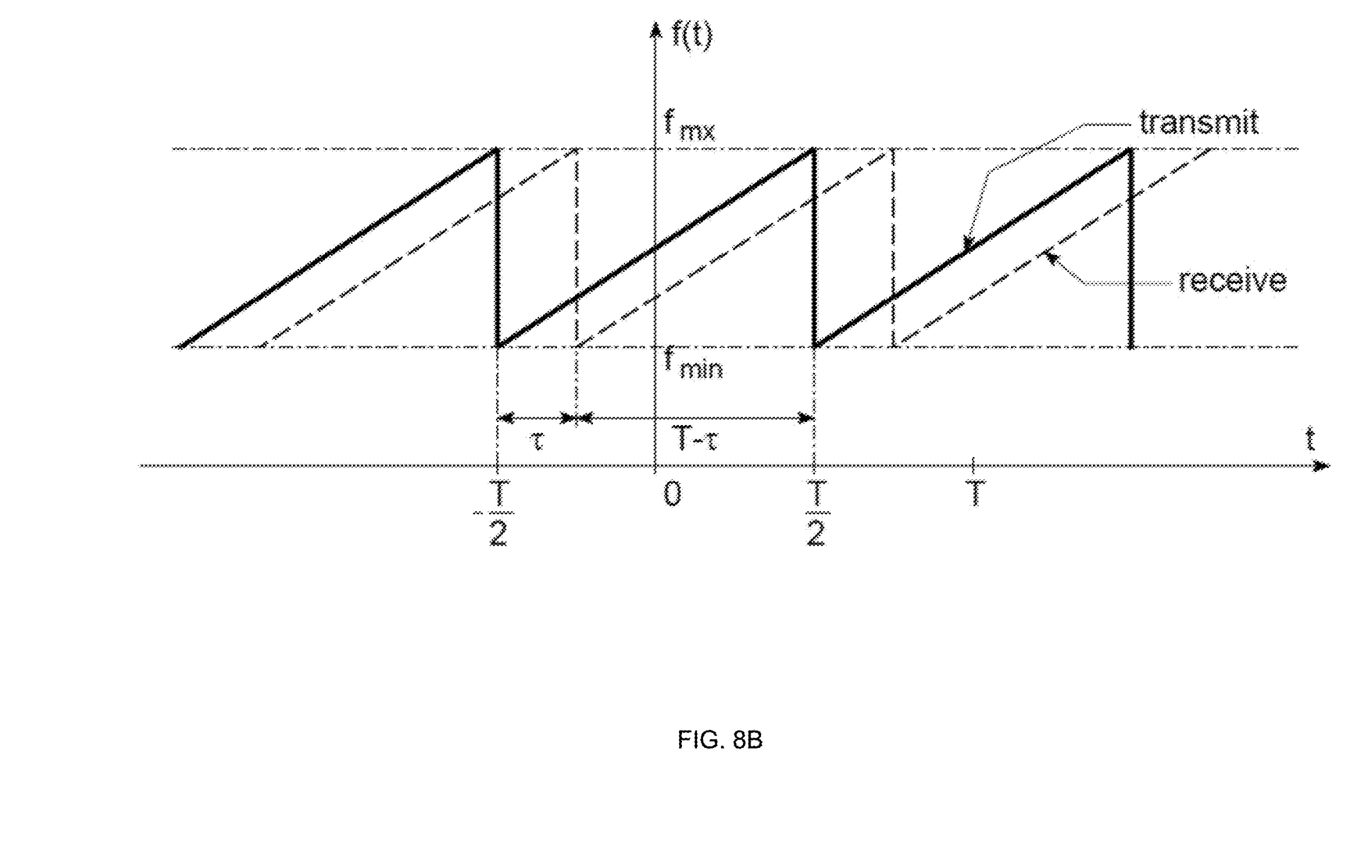
FIG. 8B illustrates a plot of exemplary transmitted and received ramp waveforms in a frequency-modulated continuous-wave (FMCW) system with a sawtooth waveform, according to various implementations of the subject technology.

FIG. 8B illustrates a plot of exemplary transmitted and received ramp waveforms in a frequency-modulated continuous-wave (FMCW) system with a sawtooth waveform. In the plot of FIG. 8B, the x-axis denotes time (t), and the y-axis denotes frequency (f). An FMCW radar (e.g., refer to 400 of FIG. 9) may use an FMCW sawtooth waveform to determine range and velocity.

During operation of an FMCW radar, a chirp signal with a sawtooth waveform is launched into the free space using a transmit antenna (e.g., refer to 422 of FIG. 9) of the FMCW radar. A chirp signal is an FM-modulated signal of a known stable frequency whose instantaneous frequency varies linearly over a fixed period of time (sweep time) by a modulating signal. The transmitted signal hits the target (e.g., a vehicle) and reflects back to a receive antenna (e.g., refer to 432 of FIG. 9) of the FMCW radar. From a single chirp, a Fast Fourier Transform (FFT) of an intermediate frequency (IF) signal (refer to FIG. 9), which is the difference between the transmit and receive signals, can be used to determine the range profile of the scanned area. The location of a peak (in frequency space) is proportional to the distance to the corresponding target. By taking multiple such chirps, and noting how the phase of a particular peak changes between pulses, the velocity from the rate of phase change can be deduced. In practice, this is determined by performing an FFT as well.

In particular, for example, the FMCW radar emits an FMCW signal with a sawtooth waveform having a period T (refer to the transmit signal of FIG. 8B). For a simplified analysis, it is assumed that the signal received (refer to the receive signal of FIG. 8B) after refection from the target is a copy of the transmitted signal, delayed by propagation time:

$$\tau = (2R)/c, \quad \text{(Eq. 1)}$$

where R is the range of the target, and c is the speed of light.

Figure 9:
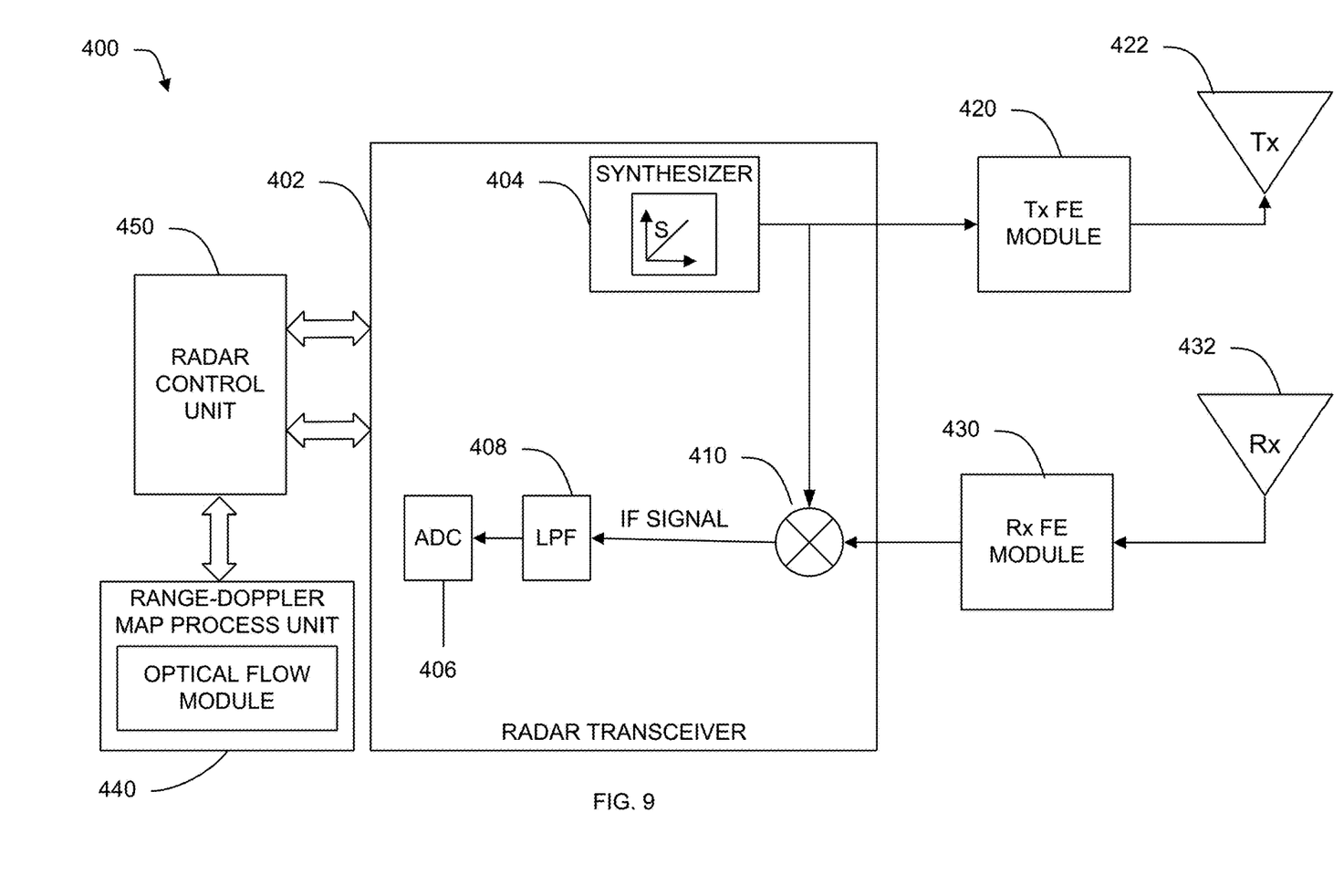
FIG. 9 illustrates a radar system incorporating an FMCW modulated signal, according to various implementations of the subject technology.

The received signal is mixed (e.g., refer to 410 of FIG. 9) with an attenuated transmit signal. After low-pass filtering (e.g., refer to 408 of FIG. 9), a low (differential) signal is obtained, referred to as a video signal. The video signal is approximately sinusoidal, and its frequency $f_\omega$, constant in the time interval $T-\tau$, equals the change of the transmitter frequency during time $\tau$, $$f_\omega = \alpha \tau, \quad \text{(Eq. 2)}$$

where $\alpha = \Delta f/T$ is a modulation waveform slope, and $\Delta f = f_{mx} - f_{min}$ (refer to the plot of FIG. 8B) is the maximum frequency deviation. As can be seen from equations (1) and (2), the measurement of the target range R is equivalent to the determining of the video signal frequency during the $T-\tau$ interval.

If a target with an initial range $R_0$ (at $t_0=0$) moves with some radial velocity v, the delay will not be constant. Under the condition v<<c, the delay will be almost a linear function of time:

$$\tau \approx (2/c)(R_0 + vt) \quad \text{(Eq. 3)}$$

As the delay change is relatively slow, it can be noticed only in the phase change of the video signal. If the signal is analyzed in K number of modulation periods, the Doppler frequency can be estimated from the phase changes, thus allowing for the target velocity to be computed.

Specifically, for example for the computation of the velocity, assume that the FMCW radar transmit antenna emits a transmit signal $u(t)=U \cos \phi(t)$, where $-\infty < t < \infty$, whose frequency is:

$$f(t)=(1/2\pi)(d\phi(t)/dt)=f_{min}+\alpha(t-kT), \quad \text{(Eq. 4)}$$

where $kT-(T/2)<t<kT+(T/2)$, and ($k=0, +/-1, \ldots$), is a periodical function of time as shown on the plot of FIG. 8B.

The received signal $u_0(t)=U \cos \phi(t)$, where $-\infty < t < \infty$, reflected from a target is delayed by the propagation time z.

Upon mixing the received signal $u_0(t)$ with an attenuated copy of the transmit signal u(t) and low-pass filtering, a video signal $x(t)=\cos \phi_\omega(t)$, where $-\infty < t < \infty$, is obtained. The video signal differential phase $\phi_\omega(t)$ can be described by equation:

$$\phi_\omega(t_k)=2\pi[f_0\tau_0+kf_dT+(f_\omega+f_d)t_k], \quad \text{(Eq. 5)}$$

where $t_k=t-kT$ and ($k=0, +/-1, \ldots$), and $-T/2+\tau<t_k<T/2$, and where $f_d=(2v/c)f_0$ is a Doppler (velocity) frequency of a signal, and $f_\omega=\alpha\tau_0$ is a video frequency value corresponding to a target at range $R_0$. The maximum unambiguously measured velocity is equal to:

$$V_{max}=c/(4Tf_0) \quad \text{(Eq. 6)}$$

FIG. 9 illustrates a radar system incorporating an FMCW modulated signal. The system 400 includes a radar transceiver 402 coupled to a radar control unit 450 and an RDM process unit 440. The radar transceiver 402 includes a synthesizer 404 to generate a frequency modulated signal that is transmitted at transmit (Tx) antenna 422 controlled by Tx front end module 420. The signal frequency increases linearly with time, such as a sawtooth wave, enabling time delay calculations to identify the range or distance to a detected object. The system 400 includes a mixer 410 that receives the transmit signal from synthesizer 404 and the received signal from receiver (Rx) front end module 430 via Rx antenna 432, and then outputs a signal at an intermediate frequency (IF) (i.e. IF signal). The IF is the difference in phase of the transmit and receive signals. The IF signal is provided to low pass filter (LPF) 408 for filtering and then to an analog-to-digital converter (ADC) 406 for conversion from an analog signal to a digital signal. The RDM process unit 440 uses the comparison information to determine range and velocity. The range is proportional to the frequency of the IF signal, and the velocity is proportional to the phase difference of the IF signal. The change in position of an object is reflected in the return time and, thus, the IF phase. In this way, both the range and velocity are calculated using the FMCW signal in the radar system 400.

Figure 10:
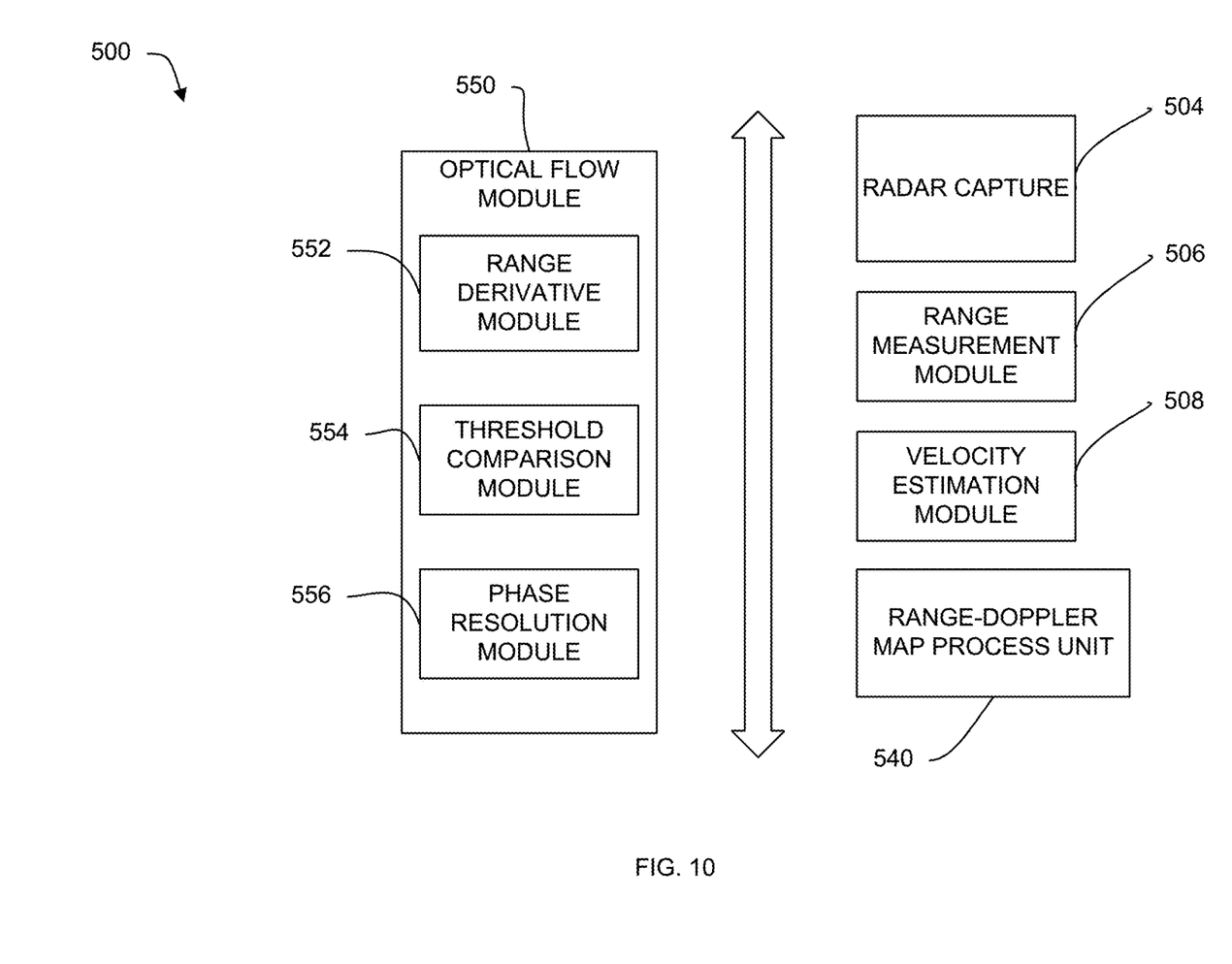
FIG. 10 illustrates an object detection system, according to various implementations of the subject technology.

FIG. 10 illustrates an object detection system 500 having an optical flow module 550 including a range derivative module 552, a threshold comparison module 554, and a phase resolution module 556. The range derivative module 552 is operable to calculate changes in range measurements as time derivatives, the threshold comparison module 554 is operable to compare the time derivatives to wrap threshold limits (e.g., a forward wrap threshold and a reverse wrap threshold), and the phase resolution module 556 is operable to correct a velocity estimation if at least one time derivative is outside the wrap threshold limits, thereby correcting the velocity estimation.

The optical flow module 550 operates in coordination with the radar modules, including radar capture module 504, range measurement module 506, velocity estimation module 508 and RDM process unit 540. The radar capture unit 504 receives reflected FMCW signals, and compares frequency and phase between transmitted and received signals. Changes in frequency correspond to distance or range, and changes in phase correspond to velocity of detected objects. The range measurement module 506 determines frequency changes and generates range data. Velocity estimation module 508 determines phase changes and generates velocity data. The output of modules 506 and 508 are input to RDM process unit 540 to generate RDMs. The velocity estimation module 508 may measure ambiguous velocities depending on the phase difference detected. If the phase difference exceeds the measurement limits of the object detection system 500, then the phase will wrap around and indicate an incorrect phase. This is the case where the system interprets a phase shift of π/4 as the same as a phase shift of 5π/4, 9π/4, and so forth. The optical flow module 550 identifies these ambiguous measurements of phase-wrapping and enables the system 500 to identify the correct phase and, thus, a more accurate velocity.

In such radar systems, the phase measure is limited to +/−π, as any value greater or less than this introduces an ambiguity into the velocity estimation. When the phase is outside of this range, the phase wraps around and a direct application to velocity is not accurate. To resolve this issue, the disclosure herein applies optical flow techniques. The optical flow considers the time derivative of the range relative to the velocity estimated from the phase, and gives an indication of whether the phase measure is outside the measurable range by comparing the derivatives to forward and reverse thresholds.

The disclosed radar system (e.g., radar system 400 of FIG. 9) may implement the various aspects, configurations, processes and modules described throughout this description. The radar system is configured for placement in an autonomous driving system or in another structure in an environment (e.g., buildings, billboards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent metamaterial antenna structures and artificial intelligence (AI) techniques to create a truly intelligent digital eye for autonomous vehicles, which can include Level 1, Level 2, Level 3, Level 4, or Level 5 vehicles, i.e. any vehicle having some capability of autonomous driving, from requiring some driver assistance to full automation.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed. Accordingly, embodiments are intended to exemplify alternatives, modifications, and equivalents that may fall within the scope of the claims.

What is claimed is:

1. A method for determining a velocity of an object detected by a radar system, the method comprising:
    capturing radar sensor data from a reflected signal;
    determining a plurality of range measurements for detected objects based on frequency changes in the radar sensor data;
    determining a plurality of velocity estimations for the detected objects based on phase changes in the radar sensor data; and
    initiating an optical flow process to confirm the plurality of velocity estimations, the optical flow process comprising:
        calculating changes in the plurality of range measurements as time derivatives;
        comparing the time derivatives to threshold limits that comprise a forward wrap threshold and a reverse wrap threshold; and
        correcting at least one velocity estimation of the plurality of velocity estimations when at least one of the time derivatives is outside a corresponding one of the threshold limits.

2. The method as in claim 1, wherein one or more of the time derivatives that falls outside the threshold limits indicate phase-wrapped ambiguous velocity estimations.

3. The method as in claim 2, wherein the radar system has a field of view, the method further comprising dividing the field of view into a plurality of pixels.

4. The method as in claim 3, wherein calculating the changes in the plurality of range measurements as the time derivatives comprises comparing range measurements for each pixel in the field of view.

5. The method as in claim 1, wherein the threshold limits identify unambiguous velocity estimations.

6. The method as in claim 5, wherein correcting the at least one velocity estimation of the plurality of velocity estimations comprises unwrapping a corresponding phase of the time derivative.

7. The method as in claim 6, further comprising:
    comparing a phase of a received signal to a phase of a transmitted frequency-modulated carrier-wave (FMCW) signal;
    determining a phase difference between the received signal and the transmitted FMCW signal; and
    identifying a velocity corresponding to the phase difference.

8. The method as in claim 7, wherein the transmitted FMCW signal has a sawtooth waveform.

9. The method as in claim 1, wherein the radar system is located on a vehicle.

10. The method as in claim 9, wherein the vehicle is an autonomous vehicle.

11. The method as in claim 1, wherein the radar system is located on a structure and the structure is one of a building, a billboard, a road sign, or a traffic light.

12. The method as in claim 1, wherein the forward warp threshold is +π or +2π, and the reverse warp threshold is −π or −2π.

13. A system for determining a velocity of an object detected by a radar system, the system comprising:
    a radar capture module configured to capture radar sensor data from a reflected signal;
    a range measurement module configured to determine a plurality of range measurements for detected objects based on frequency changes in the radar sensor data;
    a velocity estimation unit configured to determine a plurality of velocity estimations for the detected objects based on phase changes in the radar sensor data; and
    an optical flow module configured to confirm and correct the plurality of velocity estimations by comparing the plurality of velocity estimations with threshold limits, wherein the threshold limits comprise a forward wrap threshold and a reverse wrap threshold.

14. The system as in claim 13, wherein the optical flow module comprises:
a range derivative module configured to calculate changes in the plurality of range measurements as time derivatives;
a threshold comparison module configured to compare the time derivatives to the threshold limits; and
a resolution module configured to correct a velocity estimation of the plurality of velocity estimations when at least one time derivative is outside the threshold limits, thereby correcting the velocity estimation.

15. A radar system, comprising:
a radar transceiver configured to prepare modulated transmit signals and to receive reflections of the modulated transmit signals;
a range Doppler map (RDM) processing unit coupled to the radar transceiver, the RDM processing unit adapted to capture received data and to generate RDM information over a field of view, and
an optical flow module adapted to calculate changes in received data over time to identify an ambiguous measurement and correct the ambiguous measurement by comparing the ambiguous measurement with threshold limits, wherein the threshold limits comprise a forward wrap threshold and a reverse wrap threshold.

16. The radar system as in claim 15, wherein the optical flow module is configured to calculate changes in range measurement over time and compare the changes in range measurements to measurement capabilities of the radar system.

17. The radar system as in claim 15, wherein the radar system is located on a vehicle.

18. The radar system as in claim 15, wherein the radar system is located on a structure and the structure is one of a building, a billboard, a road sign, or a traffic light.

19. The radar system as in claim 15, wherein the forward warp threshold is +π or +2π, and the reverse warp threshold is −π or −2π.

20. The system as in claim 13, wherein the forward warp threshold is +π or +2π, and the reverse warp threshold is −π or −2π.

* * * * *